(12) United States Patent
Kirkendoll et al.

(10) Patent No.: US 11,446,719 B2
(45) Date of Patent: Sep. 20, 2022

(54) VIRTUAL LANDFILL TERMINAL

(71) Applicant: NexState Technologies, Ltd., Parker, CO (US)

(72) Inventors: Bert Randall Kirkendoll, Parker, CO (US); David Jedidiah Tuck, Hudson, NH (US)

(73) Assignee: NEXSTATE TECHNOLOGIES, LTD., Highland Ranch, CO (US)

( * ) Notice: Subject to any disclaimer, the term of this patent is extended or adjusted under 35 U.S.C. 154(b) by 44 days.

(21) Appl. No.: 17/153,210

(22) Filed: Jan. 20, 2021

(65) Prior Publication Data
US 2021/0220881 A1 Jul. 22, 2021

Related U.S. Application Data

(60) Provisional application No. 62/964,227, filed on Jan. 22, 2020.

(51) Int. Cl.
| | |
|---|---|
| B09B 3/40 | (2022.01) |
| C10G 1/10 | (2006.01) |
| C10L 1/08 | (2006.01) |
| C10B 57/10 | (2006.01) |
| B01D 3/14 | (2006.01) |
| B29B 17/04 | (2006.01) |

(Continued)

(52) U.S. Cl.
CPC ............... *B09B 3/40* (2022.01); *B01D 3/14* (2013.01); *B29B 17/04* (2013.01); *C10B 53/00* (2013.01); *C10B 57/10* (2013.01); *C10G 1/10* (2013.01); *C10J 3/72* (2013.01); *C10L 1/08* (2013.01); *C10M 109/02* (2013.01); *C10M 177/00* (2013.01); *B29B 2017/0496* (2013.01); *C10G 2300/1003* (2013.01); *C10G 2400/04* (2013.01); *C10J 2300/0946* (2013.01); *C10J 2300/1215* (2013.01); *C10L 2200/0461* (2013.01); *C10L 2270/026* (2013.01); *C10L 2290/06* (2013.01); *C10M 2203/003* (2013.01); *C10N 2070/00* (2013.01)

(58) Field of Classification Search
CPC ............... C10B 53/00; C10L 1/08; C10J 3/72
USPC .................................................. 585/240–242
See application file for complete search history.

(56) References Cited

U.S. PATENT DOCUMENTS

| | | | | | |
|---|---|---|---|---|---|
| 4,053,394 | A | * | 10/1977 | Fisk ........................ | C02F 3/30 210/612 |
| 4,235,676 | A | * | 11/1980 | Chambers ................ | C07C 1/00 48/209 |

(Continued)

FOREIGN PATENT DOCUMENTS

WO 2019/008094 A1 1/2019

*Primary Examiner* — Nina Bhat
(74) *Attorney, Agent, or Firm* — Preti Flaherty Beliveau & Pachios LLP

(57) ABSTRACT

Handling of municipal solid waste (MSW) is described. A method for handling MSW in a single waste processing facility includes receiving the MSW at the waste processing facility. The MSW is separated into biomass, recyclables, and plastics. The biomass is processed at the waste processing facility to produce syngas using a gasifier. The plastics are also processed at the waste processing facility to produce naphtha, diesel fuel, and/or lubricants. Waste heat from the processing of the biomass and from the processing of the plastics is captured and used in the generating of electricity at the waste processing facility. Facilities for handling MSW are also described.

53 Claims, 9 Drawing Sheets

(51) Int. Cl.
*C10J 3/72* (2006.01)
*C10M 109/02* (2006.01)
*C10M 177/00* (2006.01)
*C10B 53/00* (2006.01)
*C10N 70/00* (2006.01)

(56) References Cited

U.S. PATENT DOCUMENTS

| | | | |
|---|---|---|---|
| 6,182,584 B1 * | 2/2001 | Gaudio | C10B 51/00 202/122 |
| 10,099,200 B1 * | 10/2018 | Chandran | B01J 4/007 |
| 2003/0199718 A1 | 10/2003 | Miller | |
| 2005/0059849 A1 * | 3/2005 | Liu | B65F 1/1484 588/1 |
| 2005/0095183 A1 * | 5/2005 | Rehmat | C10K 3/006 422/600 |
| 2007/0026351 A1 * | 2/2007 | Widell | F23G 5/02 431/267 |
| 2007/0029419 A1 * | 2/2007 | Dupuis | C10G 1/00 241/24.1 |
| 2008/0274022 A1 * | 11/2008 | Boykin | C10G 1/10 44/307 |
| 2009/0062581 A1 | 3/2009 | Appel et al. | |
| 2010/0251616 A1 | 10/2010 | Paoluccio et al. | |
| 2011/0124748 A1 | 5/2011 | Kuku | |
| 2014/0093446 A1 * | 4/2014 | Weaver | C10J 3/82 422/162 |
| 2017/0215340 A1 | 8/2017 | Force | |
| 2018/0290094 A1 * | 10/2018 | Chandran | C10G 2/34 |
| 2018/0298288 A1 * | 10/2018 | Urade | C10G 3/50 |
| 2019/0299491 A1 | 10/2019 | Stanislaus et al. | |

\* cited by examiner

VIRTUAL LANDFILL TERMINAL

STATEMENT REGARDING FEDERALLY SPONSORED RESEARCH OR DEVELOPMENT

N/A

BACKGROUND

Various embodiments relate generally to waste management systems, methods, devices and facilities and, more specifically, related to waste management systems which process waste to generate energy.

This section is intended to provide a background or context. The description may include concepts that may be pursued, but have not necessarily been previously pursued. Unless indicated otherwise, what is described in this section is not deemed prior art to the description and claims and is not admitted to be prior art by inclusion in this section.

Landfill management is rapidly becoming an increasingly problematic issue for large urban areas as well as those areas with limited land available to be used for landfills. In fact, it is not uncommon to hear of "end of life" dates for existing landfills that are reaching their limits due to space or other environmental factors. For some areas, improved landfill management practices have eased the immediate problems however large urban areas continue to wrestle with what to do with all their municipal solid waste (MSW), even with improved MSW management and good recycling practices.

At present, the non-recycled plastics (NRP) stay in the ground when they are deposited in the landfills. Depending on the plastic type and thickness, plastics can take anywhere from 5 to 1,000 years to degrade. And this decomposition is not necessarily always friendly to the environment. Additionally, in January 2018, China ended its acceptance of recycled waste plastics from off shore. At that time, China was recycling over 70% of the world's plastics. This stoppage of acceptance of recycled plastics has created a great waste plastics management problem in the US and abroad.

What is needed is an improved waste management system which can fill the role of or substitute for landfills and handle a large variety of wastes, including plastics, and which can recycle or reuse a large variety of waste.

BRIEF SUMMARY OF THE INVENTION

The below summary is merely representative and non-limiting.

The above problems are overcome, and other advantages may be realized, by the use of the embodiments.

In a first aspect, an embodiment provides a method for handling MSW in a single waste processing facility includes receiving the MSW at the waste processing facility. The MSW is separated into biomass, recyclables, and plastics. The biomass is processed at the waste processing facility to produce syngas using a gasifier. The plastics are also processed at the waste processing facility to produce naphtha, diesel fuel, and/or lubricants. Waste heat from the processing of the biomass and from the processing of the plastics is captured and used in the generating of electricity at the waste processing facility. In another aspect, an embodiment provides a virtual landfill terminal system for handling MSW. The system includes a MSW receiving section for receiving MSW and for separating the MSW into biomass, recyclables, and plastics. A biomass processing section is used for processing the biomass to produce syngas, the biomass processing section having a gasifier. A plastics processing section for processing the plastics to produce naphtha, diesel fuel, and lubricants is also included. A waste heat capturing system is used for capturing waste heat from the processing of the biomass processing section and from the plastics processing section of the plastics. The virtual landfill terminal system also includes an electricity generator for generating electricity using the syngas and waste heat.

BRIEF DESCRIPTION OF THE SEVERAL VIEWS OF THE DRAWINGS

Aspects of the described embodiments are more evident in the following description, when read in conjunction with the attached Figures.

DETAILED DESCRIPTION OF THE INVENTION

Figure 1:
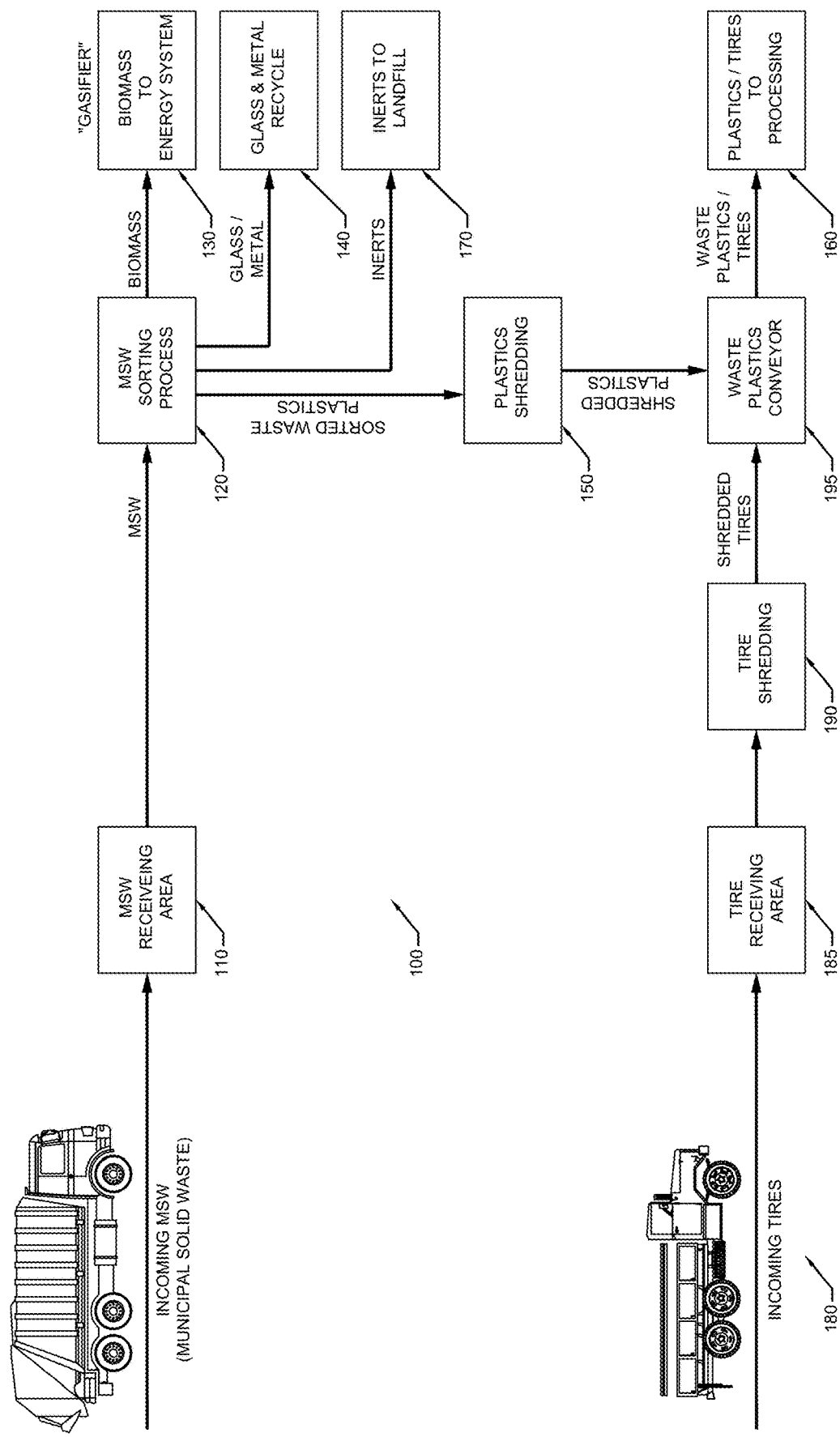
FIG. 1 illustrates a flow diagram of the virtual landfill terminal (VLT) incoming flow.

This patent application claims priority from U.S. Provisional Patent Application No. 62/964,227, filed Jan. 22, 2020, the disclosure of which is incorporated by reference herein in its entirety.

Various embodiments provide methods, systems and apparatus to recover/generate oil and gas as well as renewable energy from trash and plastics. These embodiments can be considered as a Virtual Landfill Terminal (VLT) which replaces the role of existing landfills which receive waste for disposal. By processing the waste, the VLT can avoid the long-term difficulties and potential environmental impacts of indefinite storage. Furthermore, the VLT can generate useful byproducts, such as oil, gas, and lubricants in addition to generating electricity.

It should also be understood that for each specific installation, the size required (and subsequently, throughput) will vary based on local needs. That means that each installation's sections/systems are also sized to meet local needs. For example, the MSW content for a large metropolitan area in the Dominican Republic (such as Santo Domingo—four million people) and Belize City (125,000) will be different in scale and waste content percentages.

The VLT provides a comprehensive waste management system that allows municipalities to combine all physical solid waste management requirements for a region into one location. The VLT allows for dropping off of MSW at one location and for sorting, processing and creating of electricity, diesel fuel, naphtha, and other potential fuels. At the end, all processable solid waste is either processed or sent to recycle (glass and metals). In some embodiments, liquid waste may also arrive at the waste management system. The liquids may be received pre-sorted or mixed with the solid waste elements. Mixed waste can be sorted out and the liquid waste forwarded to the appropriate processing (e.g., for hazardous material storage or otherwise).

Inert materials such as porcelain, concrete, drywall, etc. that has no British Thermal Unit (BTU) value (and is biologically stable) is sent directly to a landfill (generally less than 10% of the total waste). Those components that can be processed have a 98 to 99% mass reduction to a slag product that can be used for road base or concrete filler. It is also bio-stable at that time. In other words, if it can be processed, it is 100% processed and made usable in some form.

Various embodiments use proven, state of the art gasifier technology designed specifically to process biomass in a clean, responsible manner. This technology will produce approximately 2 MW of electricity for every 60 tons of biomass processed. One aspect of gasifier technology is that it is considered a "non-combustion" technology. It is a high heat, low oxygen, no-flame technology. The resulting synthetic gas (syngas) is composed largely of hydrogen, carbon monoxide (both combustible gases), and methane, with fractional amounts of other gases such as propane, ethane, butane, etc. These synthetic gases are then combusted in a thermal oxidizer to a temperature of about 1,225° C. where it is used to produce steam to drive steam turbine generators or the syngas, after some gas preparation, can be used as fuel gas for internal combustion or turbine engine driven generators. Emission levels for this process can achieve attainment levels for any emission compliance requirement. This is attained because the percentage volumes of gasses created are fairly clean burning and any emissions that are created can be processed through scrubbers and Continuous Emissions Monitoring Systems (CEMS units) to reduce emission levels to meet any standard. Hydrogen (one of the larger components of the syngas stream) actually makes water when combusted.

Typical landfill material percentages are:
Biomass—45 to 70%
Plastics—15 to 20%
Glass & Metals—15 to 20%
Inerts—5 to 10%

With the gasifier system, the biomass and small plastics can be processed (gasified) converting them to synthetic gas. The remaining glass and metals are sorted out at the beginning of the process and are recycled. The biomass that is gasified is reduced to approximately 5% of its former mass. The ash from the gasifier is stable carbon that will go to landfill. This process thus reduces typical landfill mass by about 95%. And the remaining landfill material is a biologically inert instead of all the contaminants presently being disposed of. Implemented on a broader scale, this "virtual landfill" will reduce landfill ecological contamination on a large scale. In present landfill arrangements, 100% of landfill biomass eventually converts to methane unless some form of methane capture is implemented. According to the EPA, Methane has 26 to 36 times the Green House Gas (GHG) impact of $CO_2$. Various embodiments feature a 100% conversion to synthetic gas whose emissions (when processed through a thermal converter/oxidizer) can be managed and maintained in a responsible/acceptable manner.

Finally, by implementation of a virtual landfill closer to the urban centers where large volumes of MSW are generated, they can not only reduce the environmental impacts as described above, but also by reducing truck traffic by millions of miles per year. The virtual landfill can also increase public safety by reducing the truck traffic significantly, and decreasing truck emissions for every mile they do not have to drive. All in all, this too is a significant advantage. Various embodiments provide a facility where:
   All waste arrives by truck to one facility
   The facility sorts the waste into different streams for processing
   These streams are:
      Biomass
      Plastics
      Tires/rubber of all kinds
      Recyclable glass and metals
      Inerts—concrete, porcelain, etc.
   The VLT produces:
   Electricity
   A variety of possible liquid fuel types
   Naphtha
   Clean, low Sulfur diesel fuel
   High grade lubricants FIG. 1 illustrates a flow diagram of the virtual landfill terminal (VLT) incoming flow 100. As shown, the incoming MSW arrives by truck into the MSW receiving area 110. The MSW is then sent for sorting 120 into biomass, glass/metal, waste plastics and inerts. The glass/metal are sent for recycling 140 while inerts are sent to a landfill 170. Waste plastics are sent to plastics shredding 150 and the shredded plastics are sent to plastics processing 160, this may include the use of a conveyer 195 to move the waste plastics. The shredded plastics may also be combined with incoming tires 180 which are received in the tire receiving area 185 and shredded in tire shredding 190. The biomass component is sent for processing 130 in the WTE system using gasification.

Gasification is a thermo-chemical process that produces a clean fuel gas. This is NOT incineration. The produced heat breaks down the material to create synthetic gas (syngas) which we use to make power.
   What can be Gasified?
   MSW (Municipal Solid Waste) Biomass
      Woodchips
         Scrap pallets/Construction
         Bark or green wood
         Commercial waste
      Biomass of all kinds
      Agricultural and animal waste
      Small plastics
      Food processing waste
      Feedstock 'blends'

Figure 2A:
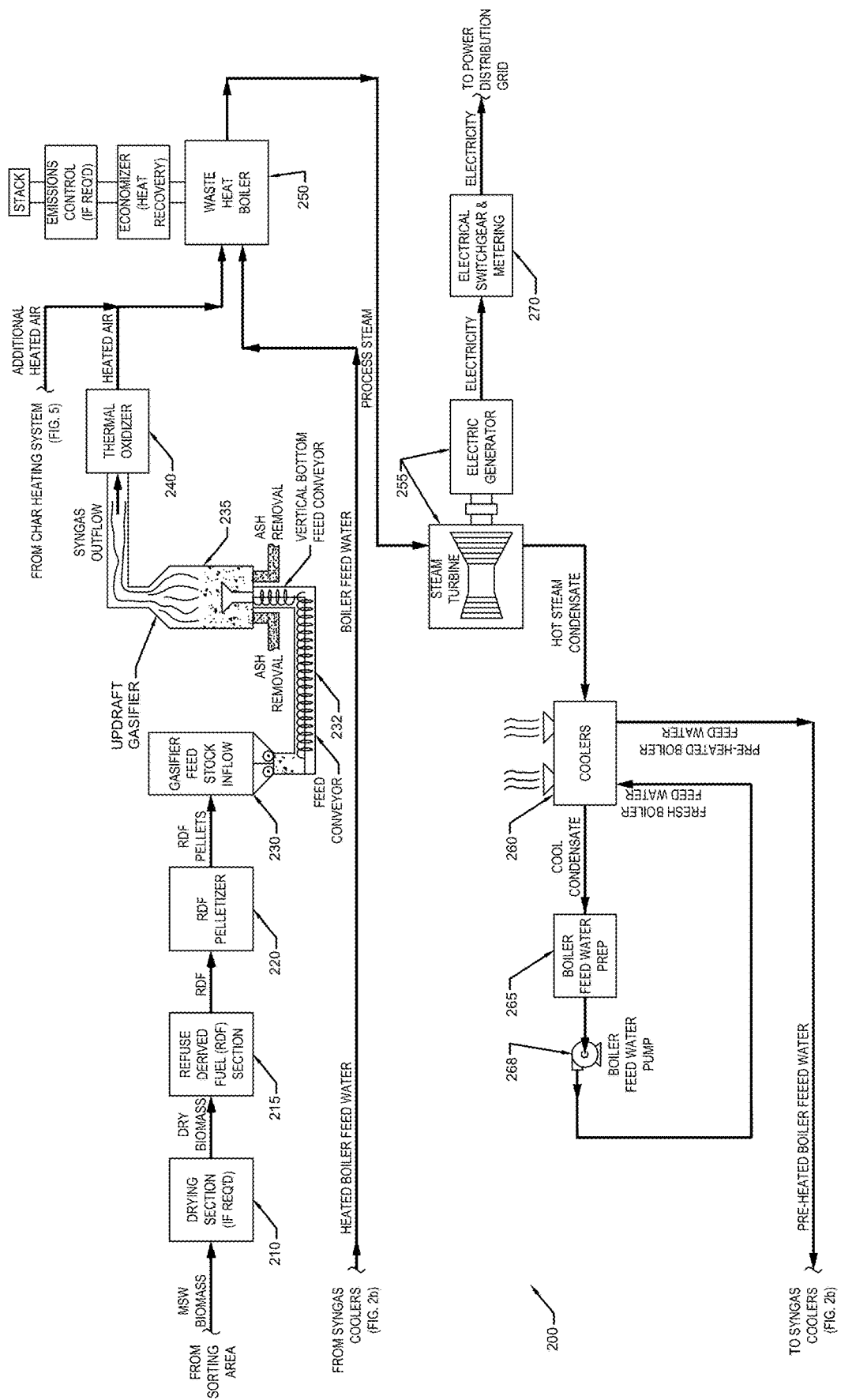
FIG. 2(a) illustrates a flow diagram of the VLT waste-to-energy (WTE) with steam turbine.
Figure 3A:
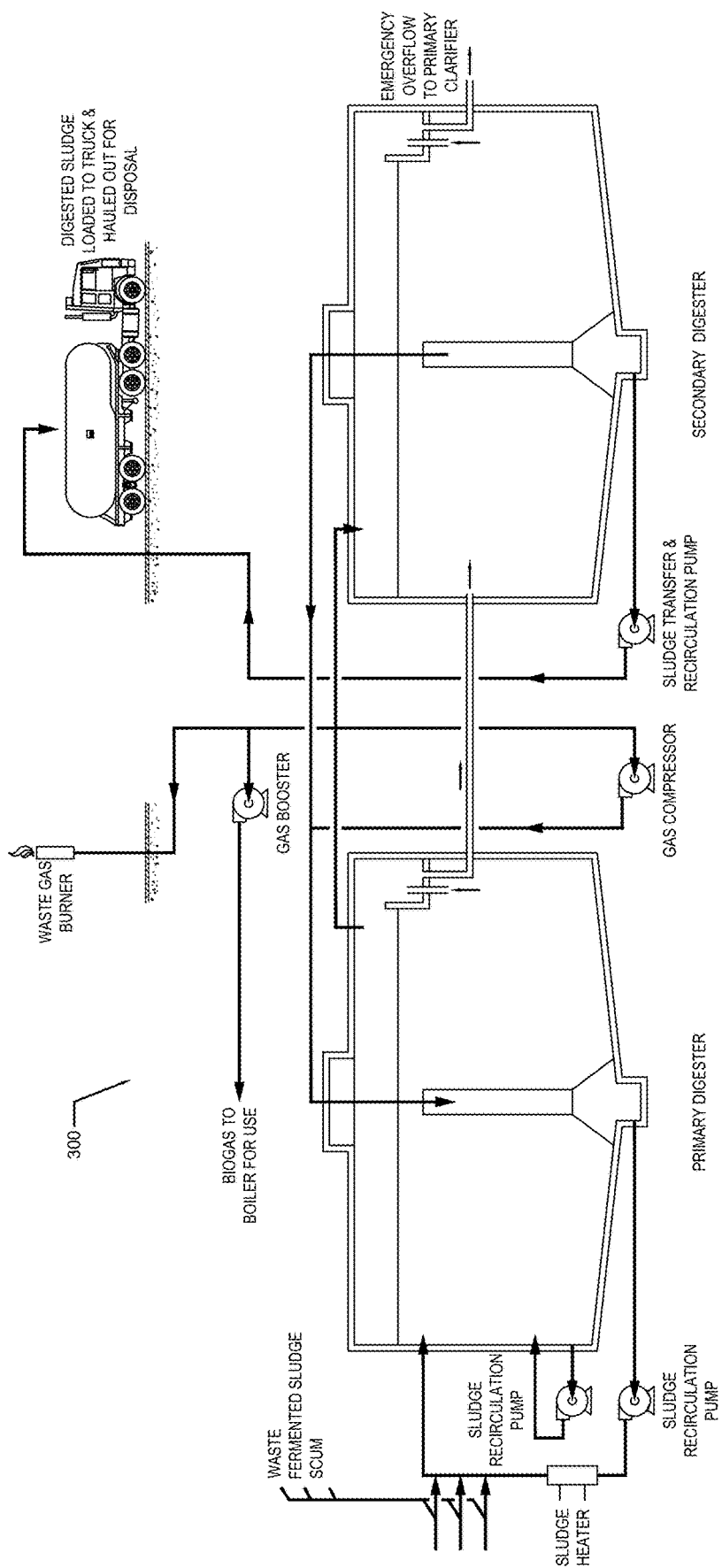
FIG. 3(a) shows the processing in a conventional digester.
Figure 3B:
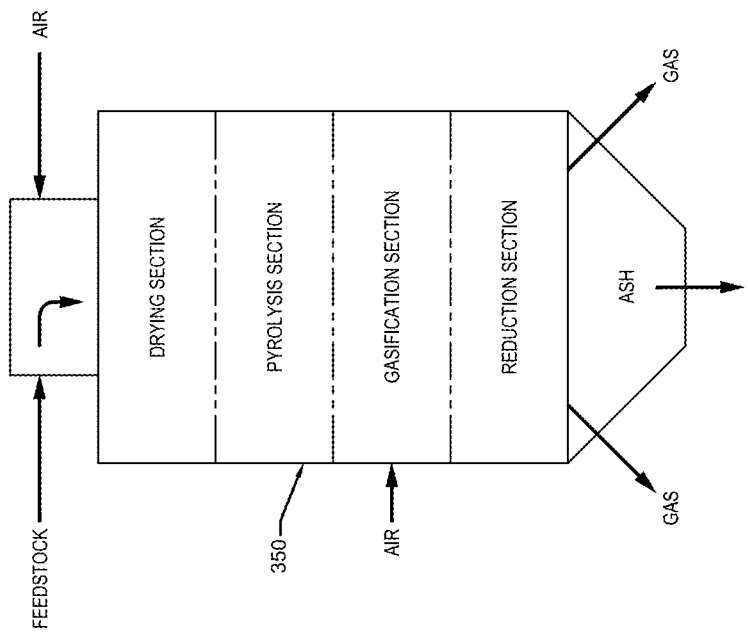
FIG. 3(b) shows the processing in a typical gasification unit.

FIG. 2(a) illustrates a flow diagram of the VLT waste-to-energy (WTE) system 200. MSW is received from the MSW sorting area containing biomass of various kinds. The biomass is sorted out of the MSW stream and forwarded into the gasification process. Depending on the moisture content of the biomass input, biomass drying may be required (gasifiers typically require no more than 30% moisture content in the biomass stream), a drying section 210 is used to dry the biomass. The (dried) biomass is fed into a Refuse Derived Fuel (RDF) System 215 that creates an RDF fluff. The RDF fluff is then fed to an RDF Pelletizer System 220 which condenses the RDF fluff into fuel pellets to feed the Updraft Gasifier 235 system in order to generate syngas. Conventional systems use Digesters which have an efficiency typically ~30% Methane. In contrast a Gasifier allows nearly 100% conversion. FIG. 3(a) shows the processing in a conventional digester 300 and FIG. 3(b) (showing a downdraft gasifier) shows the processing in a gasification unit 350. Biomass is processed in these digesters 300 in a manner similar to processing done on sewage solids in a typical sewage waste treatment facility. Biomass enters the digester in a liquid slurry composed of water and enzymes designed to breakdown the biomass over a period of time. Heated to a nominal 100° F., usually using steam, the biomass is heated and stirred for about 3 weeks, breaking down the biomass into largely methane gas, some CO2. The solids are converted to a sterile sludge called digestate. Though a stable, well known process, the actual conversion rate of biomass to biogas (largely methane) is relatively modest (a nominal 30% versus 100% in gasification). Furthermore, and nearly as impactful, the digestate solids that are removed from the digester still contain methane that will offgas after removal. There are various means of managing digestate but a common one is to spread the sludge on the ground and let it dry, then dispose of it. This drying process results in further, long term, degradation of the digestate into methane, which is then released to atmosphere. Stopping this additional kind of release of methane to atmosphere is another area of improvement that the VLT allows. The VLT results in a 100% conversion of biomass to Syngas with none of the methane going direct to atmosphere. Because methane has 25 to 35 times the Global Warming Potential of CO2 (according the US EPA), this is a significant improvement in biomass handling and management, resulting in an exponential improvement in Global Warming Potential over biomass digestion. Waste to Energy (WTE) systems 1. Gasifier Specifications A primary component of the WTE system is the Updraft Gasifier 235. Other gasifier types can also be used, such as Downdraft and Fluidized bed. The Updraft Gasifier 235 is based on a modular design of 60 dry tons per day (TPD) per unit. So, for example, if an area required processing of 400 tons per day of biomass, there are 2 steps in determining how much gasification is required.

First, it is assumed that the biomass is to be dried. The gasifier 235 operates best with a consistent moisture content because of the operational requirements of the unit. Moisture content of biomass will vary greatly depending upon the region and the biomass content. Generally, there will be about a 40% reduction in weight by volume after drying, especially in tropical regions. So, if one wishes to process 400 TPD of wet biomass, 400×0.6=240 TPD of dry biomass.

Therefore, to process 240 TPD of dry biomass, four (4) 60 TPD gasifiers may be used. Another consideration will be spare and backup capacity within the facility. For example, with 4 operational 60 TPD gasifiers processing the above biomass volumes, there would be no capability for the downtime to support maintenance outages on any unit (so as to not require a plant shut down for maintenance) so one might wish to consider a fifth unit as a backup.

With the above as a key design basis factor for biomass processing, incoming conveyance and shredding can be provided to deliver the volumes at specific locations in the incoming systems of the WTE systems. A detailed description of the gasifier operations is provided later in this document.

2. Power Generation Specifications

A primary specification of importance for the power generation component is that one can expect to achieve about 2 megawatts of power continuously for about every 60 dry TPD of biomass processed. So, using the example noted above, 240 dry TPD would be expected to produce about 8 megawatts continuously from the facility. (Again, do not confuse wet TPD (400 in this case) vs. dry TPD (240 in this case).)

Waste Plastics Facts

Globally one of the most challenging waste materials to deal with

Annually over 300 Million metric tons created

In 2014, about 33 Million metric tons created in US 9.5% was mechanically recycled 15% was combusted in WTE plants 75.5% went direct to landfills Estimated an additional 5 to 13 M metric tons of plastics are entering the oceans annually In 2018, the largest plastics recycler (China) quit accepting all foreign plastics, as did most other nations. As of today, only a small fraction of plastics are being recycled anywhere.

Plastics to Fuel technology converts waste plastics to usable synthetic gas and clean, low sulfur diesel fuel and other products.

Plastics to Diesel Sections

1. Plastics to Diesel Production for a Single Unit

There are various designs for the Plastics to Diesel section of the facility. One design which can be used is a function of how much plastics for a given area is to be processed. For larger systems, the design detailed in FIG. 4(*a*) may be used. For smaller systems, the design detailed in FIG. 4(*b*) may be more suitable. FIG. 4(*a*) illustrates the Plastics to Diesel (PTD) section of the facility and is based on a standard modular design process of 150 TPD of plastics (any kind). That equates to 50,000 tons of plastics per year. This configuration is expected to produce around 230,000 barrels of hydrocarbon product (diesel and naphtha)—some 9.66 MM gallons/year.

In this configuration, approximately 80% of the product will be diesel (184,000 barrels/7.728 MM gals/yr.). The remaining 20% will be heavy naphtha (46,000 barrels/1.932 MM gals/yr) or lubricants.

FIG. 4(*b*) denotes the Plastics to Diesel (PTD) section of the facility for smaller systems based on a standard module design process of 5 TPD of plastics (any kind). That equates up to 1,800 tons of plastics per year for each stream. Parallel streams can be installed when more small volumes (less than 150 TPD) are required to be processed. This configuration can produce 1.8 MM gallons of low sulfur diesel per year per stream. That volume can be multiplied by the number of units installed at a single location. 2. Tires to Diesel production from a single unit Because the crude content of tire rubber is lower than that of plastics, the resulting diesel output of tire processing is lower than that of plastics processing. The result is a drop of about 15% of output production. So, in general terms, the above numbers for plastics production can be multiplied by 0.85 and the resulting outcome represents about what one can expect from straight up tire production. So, using the numbers above:

The Tire to Diesel (TTD) section of a facility is also based on a standard modular design process of 150 TPD of tires. That equates to 50,000 tons per year. This configuration is expected to produce around 195,000 barrels of hydrocarbon product (diesel, naphtha, and lubricants)—some 8.211 MM gallons/year.

In this configuration, approximately 80% of the product will be diesel (156,400 barrels/6.568 MM gals/yr.). The remaining 20% will be heavy naphtha (39,100 barrels/1.642 MM gals/yr) or lubricants.

While it may appear on the surface to be an appreciable drop (15%), tire processing is actually easier in a variety of ways. The collection process is simpler, and tires are common in highly urbanized areas. Additionally, tip fees can add significantly to the margins realized by tire processing and the sorting cost per unit is minimal as compared to plastics within MSW.

Another important feature of the Plastics to Diesel facility capabilities is that the unit can process comingled feed stocks of plastics or tires at the same time. Therefore, it is not necessary to have a specific process line dedicated to a specific feedstock if it is more advantageous to blend them.

Incoming Section

The incoming section of the VLT is where the waste trucks will drop their loads of MSW. Additionally, in facilities where tires will be processed, there can also be a dedicated a tire incoming section.

In the incoming section MSW will be sorted into the four waste streams identified below. Sorting can be achieved through any combination of automation/manual labor. Some locales prefer to be more manually intensive to provide employment for local citizens. The ratio of sorting equipment automation to manual labor can be adjusted per facility. An important factor in this ratio is the total amount of MSW to be processed. In large urban areas with high volumes of MSW, manual processing in large amounts may not be practical.

In the incoming section, the MSW will be sorted into four primary streams. These are:
1) Biomass for gasification.
2) Metals and Glass that will be processed for recycle.
3) Plastics that will be sent to Plastics to Diesel processing.
4) Inerts that will be sent to the landfill.

On the tire processing side, tires will be brought in (in a separate section) and sent to shredders to prepare them for further processing.

MSW Biomass Gasification and Power Generation

The Gasifier (power plant section) facility 200 is composed of several components. They are:
Dryer section 210
Refuse Derived Fuel 215
RDF Pelletizer Section 220
Gasifier Feedstock Inflow Area 230
Gasifier Feed Conveyor Section 232
Updraft Gasifier 235
Thermal Oxidizer 240
Waste Heat Boiler 250
Steam Turbine Generator 255
Condensate Cooler 260
Boiler Feedwater Preparation Section 265
Boiler Feedwater Pumps 268
Electrical Switchgear and Metering Section 270

The following sections will describe each of the above in some detail.

Dryer Section

As the biomass is processed in the incoming section, it will also be shredded to prepare it for drying and gasification. The process operates best when the biomass moisture content is consistent for processing. In most applications, some drying is expected. The dryer section 210 is comprised of a forced air heater exchanger that dries out the MSW to acceptable levels for gasification.

Refuse Derived Fuel Section

Refuse Derived Fuel (RDF) is a technology that converts the biomass incoming flow into a consistent fuel usable as feedstock for a gasifier system (among others). When biomass is received from the incoming section, it is not necessarily a homogenous blend easily gasified. RDF processing 215 blends the biomass into a more homogenous mass, evening out the BTU content of the biomass such that when the syngas is created, the BTU content will be consistently more linear in the gas composition, which is important later in the process. RDF composition upon exiting of this section is relatively dry with a fluff consistency.

RDF Pelletizer Section

The next step in the process is to prepare the RDF for insertion into the gasifier. To do this, we pelletize the RDF in the RDF Pelletizer Section 220. Pelletization densifies the RDF into pellets that are easier to manage in the gasifier feed conveyor system and pellets provide for a better fuel management system in the gasifier itself. The higher and more consistent BTU content of the pellets allows for much better heat control inside of the gasifier. Gasifier Feedstock Inlet Flow Area At the incoming section of the gasifier is a gasifier feedstock inflow area 230 where the RDF pellets are stored until called for by the gasifier control system. Several days' worth of feedstock are stored here.

Gasifier Feed Conveyor

The Gasifier Feed Conveyor 232 provides for the transport of the pelletized RFD to the gasifier 235 itself. This conveyor is comprised of a horizontal feed conveyor that transports the pellets from the Inflow Area 230 to the vertical conveyor into the gasifier 235. The vertical conveyor transports the pellets vertically into the Updraft Gasifier incoming section. This conveyor is the primary means of heat control (through fuel flow management along with $O_2$ flow control) in the gasifier. Updraft Gasifier Gasification is a process of heating some material (usually biomass of some kind) in a non-combustion process in a low oxygen environment. This heat and low oxygen (2 to 3% oxygen) break down the material into gases (hydrogen, carbon monoxide (a combustible gas), methane, and a few other minor combustible gas components).

The specific type of gasifier to be used can depend on what feedstock may be coming into the unit. Typical gasifier types include Downdraft, Updraft, and Fluidized Bed. In this example, an Updraft Gasifier 235 can be used. However, any of the three types mentioned can be used, depending upon the specific application.

In Updraft Gasifier 235 the RDF pellets are conveyed vertically into the gasifier into the gasifier refractory (heated) area. Using level management instrumentation, the incoming flow is controlled to keep the gasifier level consistent. While maintaining minimum oxygen levels in the gasifier through either variable air damper controls or through a forced draft fan on a Variable Frequency Drive, the combination of fuel flow rate and $O_2$ flow rate provides the environment needed for pyrolysis and ultimately gasification, producing Syngas. As the solids are gasified and the syngas is produced, the remaining solids (in an updraft gasifier) are a fine carbon ash. The mass of this ash is less than 5% of the incoming RDF pellets, thus resulting in about a 95% mass reduction. This ash can be sent to landfill for burial along with the other inerts. The biomass content in this section is expected to be largely some form of paper, wood, food waste, agricultural waste, etc. Additionally, the updraft gasifier 235 can also process small plastics. Small bits of plastics (wrappers of various kinds) are expected to be processed with the biomass MSW. All of this will be dried (as required), turned into RDF, pelletized, then conveyed into the inlet of the gasifier. As the biomass passes through the gasifier 235, it is heated to some 1,300 to 1,400° F. where gasification, in an oxygen starved environment, occurs.

Thermal Oxidizer

The Thermal Oxidizer 240 is basically a large chamber that combusts the syngas to release the BTU's they contain. Thermal Oxidizers 240 have full Burner Management Systems in them that makes for a safe (NFPA regulated) combustion process. The Thermal Oxidizer 240 also has a Combustion Control process that regulates the outlet temperature of the unit. There is a large combustion air blower on the front end of the unit that (through process controls) assures a proper fuel to air ratio in the unit as well as supplying hot air to the next phase of the process. Air temperature at the discharge of the Thermal Oxidizer runs at about 2,200° F.

Because of the composition of syngas (Hydrogen, Carbon Monoxide, Methane, and other minor combustible gas components), syngas is actually cleaner than normal natural gas (Methane) alone. Therefore, the emission stream of a syngas fueled Thermal Oxidizer 240 is cleaner than a natural gas fired Oxidizer.

Waste Heat Boiler Section

As the hot air leaves the Thermal Oxidizer 240, ductwork forces the hot air into a Waste Heat Boiler 250. This section is composed of a typical water tube boiler producing steam to later turn a steam turbine generator. The boiler will implement stack economizers and a superheater to maximize steam production and optimize boiler operation to its maximum. Steam produced by the boiler(s) will produce about 80,000 pounds per hour of steam per boiler at a nominal pressure of 900 PSI and a temperature of 500° F. for use in the Steam Turbine Generator Section 255. Loss of power on a regular basis can be a crippling process deficiency placing revenues at risk. This issue is especially impactful in remote areas not serviced well by a controlled electrical distribution grid or on remote islands (such as in the Caribbean region). The assurance of facility operability, electrical readiness, and availability are addressed by designing a vertically integrated supply chain for electrical power.

This is an aspect of the site power plan. By making power (for both Waste to Energy and Plastics to Diesel), at cost, the facility has enough power without a negative budgetary impact. Redundant generation capability is provided as well as a black start generation capability if required where not on a grid. Electricity produced in excess of what is needed can be sold to the local power utility. Steam Turbine Generator Section The steam created in the Waste Heat Boiler 250 is piped to a process steam header providing motive steam for the Turbine Generator 255. The Steam Turbine will be controlled via a Turbine Control System to turn the electrical generator to produce power for the site and sale of excess power to the local utility. Various embodiment can produce an excess of about 2 MW per gasifier installed at each site. The turbine control system will control turbine and generator speed at the local system frequency (60 Hz for most anticipated systems) at a nominal 4.16 KV or 13.8 KV. Condensate Cooler After the steam is used in the Steam Turbine Generator 255, steam condensate will be discharged from the system. Before further processing can occur, the condensate can be cooled. The Condensate Cooler 260 uses fans, cooling fins, and atmospheric air to cool the steam condensate (high temp water at this point) to drop the outlet temperature of the condensate to a level that allows the condensate to be conditioned and returned to the boiler feedwater preparation system 265 for recirculation through the Waste Heat Boiler 250. Boiler Feedwater Preparation Section The Boiler Feedwater Preparation Section 265 provides the necessary equipment and systems needed to prepare the water used in the boiler. Through heating and steam generation in the boiler, a variety of chemical reactions can occur that will shorten the life of a large process boiler if not remediated ahead of time. Depending upon the composition of the water at a specific site, the following systems can be included in the Boiler Feedwater Preparation System:

Filtration systems (to remove dissolved or suspended solids and organics) Ion Exchange/Softening systems Reverse Osmosis and Nanofiltration Deaeration/Degasification Other Chemical systems These systems are combined systematically, along with the condensate recovery system from the turbine and freshwater intake (as required) to maintain boiler feedwater volumes and levels in the Waste Heat Boiler drum. Boiler Feedwater Pumps The Boiler Feedwater Pumps 268 provide the motive force to circulate the prepared boiler feedwater from the preparation system to the Waste Heat Boiler. Typical Boiler Feedwater Pumps 268 are controlled by the boiler drum level control system. Normal drum level controls are referred to as 3-Element drum level PID controls that measures boiler drum level, measure steam flow at it leaves the steam drum, and allows fresh boiler feedwater into the drum for continuous steam production. Electrical Switchgear and Metering At the front end of an electrical system of this kind is the primary Electrical Switchgear and Metering Section 270. Each generator at a specific site may have the capacity to power the entire site, if desired. In some embodiments, multiple generators in parallel may be used. Synchronizing generator controls can be implemented (industry standard) to synchronize the on-site generator frequencies with each other, with the utility grid line frequencies, and black start generators (if desired in specific cases). Electrical switchgear can be implemented to provide primary power management on site for power distribution, overcurrent protection, and other electrical protective relay functions, as are typical for systems of this size and configuration. Electrical metering will also be provided, recording how much electrical power is consumed on site and logging the total electrical power released to the grid, for billing purposes. Depending on the utility line voltage to a specific site, step up transformers may be required if incoming line distribution voltages are higher than that produced on site. In addition, interlocking from the local utility will be implemented to prevent site generated power from tying to the grid without utility permission. Alternatively, a syngas fired engine driven generation system can be used that will reduce the size of the generation system (FIG. 2(*b*)). While engines can be direct fired from syngas, the syngas is cooled and cleaned prior to use in generator engines. The following components are used for a syngas fueled, engine driven electrical generating system.

Syngas Coolers 275

Syngas Filtering and Cleanup 280

Engine Driven Generator Section 285

Electrical Switchgear and Metering 270

Syngas Coolers

Various embodiments overcome some technical challenges in order to fire generating systems engines (internal combustion or turbines) to make electrical power. There are the temperature issues related to the syngas as it exits the gasifier. There are also chemical issues related to the syngas composition and corrosion. We will deal with the cooling in this section.

Figure 2B:
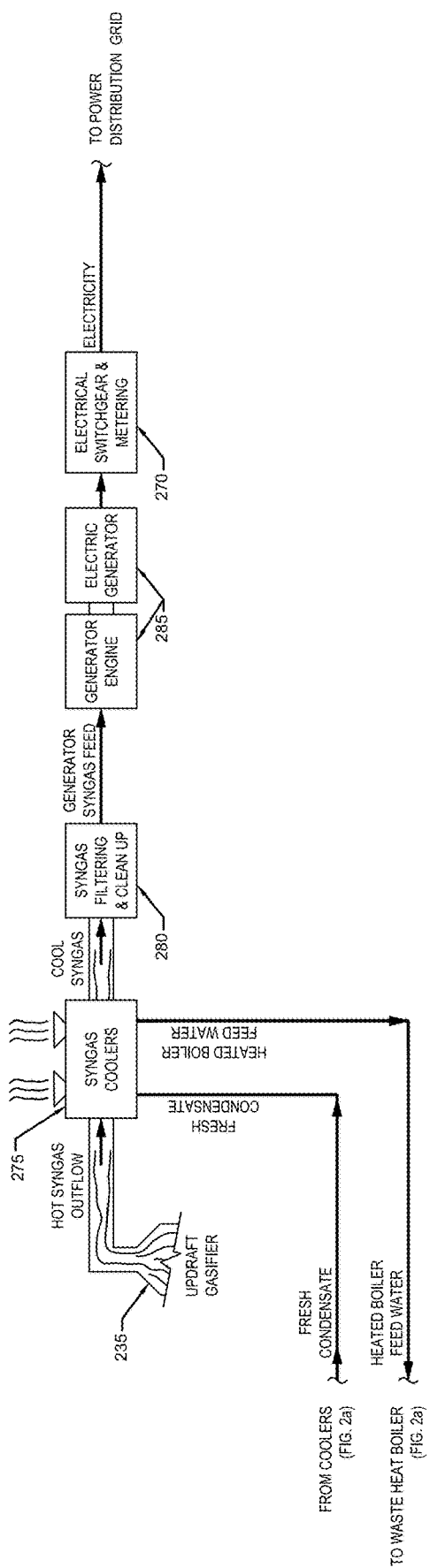
FIG. 2(b) illustrates a flow diagram of VLT waste-to-energy (WTE) with gas engine generator.

When syngas exits the gasifier section of the process, syngas temperatures are in the 700° to 800° F. temperature range. The amount of latent heat contained within the process requires cooling of the syngas before any further use or processing. Cooling will occur in two steps. Immediately upon exit from the gasifier, a syngas cooler section 275 is installed. In this section, economizer type coils are installed to preheat boiler feedwater. That will carry off some of the syngas heat and economically reuse that heat to preheat boiler feedwater waste heat boiler section. FIG. 2(b) demonstrates the process when a gas engine is used instead of a steam turbine. In the event that an engine driven generation system is implemented, the syngas exits the gasifier 235 at high temperature. In this case, since the syngas is to be prepared for engine fuel train use, pre-processing steps are used. As the syngas exits the gasifier 235, it enters the syngas cooler 275 (FIG. 2(a)). Cooling coils extract heat from the syngas in this section. Depending on the application, the project economics, and the scale, the cooling coils could be part of a regular cooling fan (fin fan) system or it could be the pre-heat section of a boiler feedwater system, again using waste heat from the syngas as a preheating medium. On larger systems, waste heat from the gasifier syngas and other sections of the facility economically justify a small waste heat boiler or heater and use of Organic Rankine Cycle generators or a small steam turbine generator. Syngas Filtering and Cleanup After cooling, the syngas is ready for the post gasification cleanup to prepare it for engine combustion. At this point in post gasification, the MSW generated syngas can have a variety of gases and/or solids in its composition that would be harmful or less than optimal for an internal combustion or turbine driven engine. These include hydrogen sulfide (H2S), carbon solids, CO2, and other potential problematic and/or corrosive components.

The syngas filtering and cleanup section 280 is be comprised of industry standard systems and subsystems designed to remediate these issues. Specific to H2S and CO2, amine systems are used industry wide to remove or reduce these gases to acceptable levels that will inhibit corrosion in the fuel train. Additional emission control steps can include wet scrubbers and dry scrubbers. These are standard technologies for these kinds of processes. Filtering will be used to remove any carbon solid particulates in the syngas. And finally, a small compressor or blower system be used to boost syngas pressures as needed to provide the required fuel gas pressure needed by the Generator Engine System 285. Engine Driven Generator System For each system installed using an Engine Driven Generator 285, the engine of choice is determined based on project size. Smaller systems (nominally 10 MW's or less) can use a single or multiple internal combustion engine generators to produce electrical power. As the project size goes to larger power generation (based on the amount of syngas being created) turbine generators can be implemented. Similar in function to the steam driven generators described in the last section, either internal combustion or turbine driven generators create electrical power for internal use in the facility as well as for sale to the grid of surplus power made. Generally speaking, site power generation will be at voltages lower than utility power voltages coming in on the electrical utility grid. Most applications can create power internally at a nominal 4.16 KV, 60 Hz internally or 13.8 KV 60 Hz. Step up transformers can be used to transform voltages to meet the line voltage of the utility. Synchronizing generator controls may be used to confirm that internal generator system frequencies are electrically synchronized with grid power before closure of the tie breaker to the utility. Electrical Switchgear and Metering 270

After the power is generated in the generator section 285, the power is sent to the power management and utilities connections system 270. Here the power is monitored and controlled and the unit ultimately connects to the utility grid.

First, the power generated is used by the facility itself, thus assuring power security on site. Onsite power management and generator controls can be tied to the local utility grid for frequency and voltage synchronization as well as electrical custody transfer metering.

Local site requirements can include primary and secondary switchgear, transformers, and motor control centers. Live communications links with the local grid may be used to assure good handshaking with the utility.

Metals and Glass to Recycle

All metals and glass can be sorted and forwarded to recycling 140. This may be done manually and/or using automated systems.

Plastics to Diesel Processing

Figure 4A:
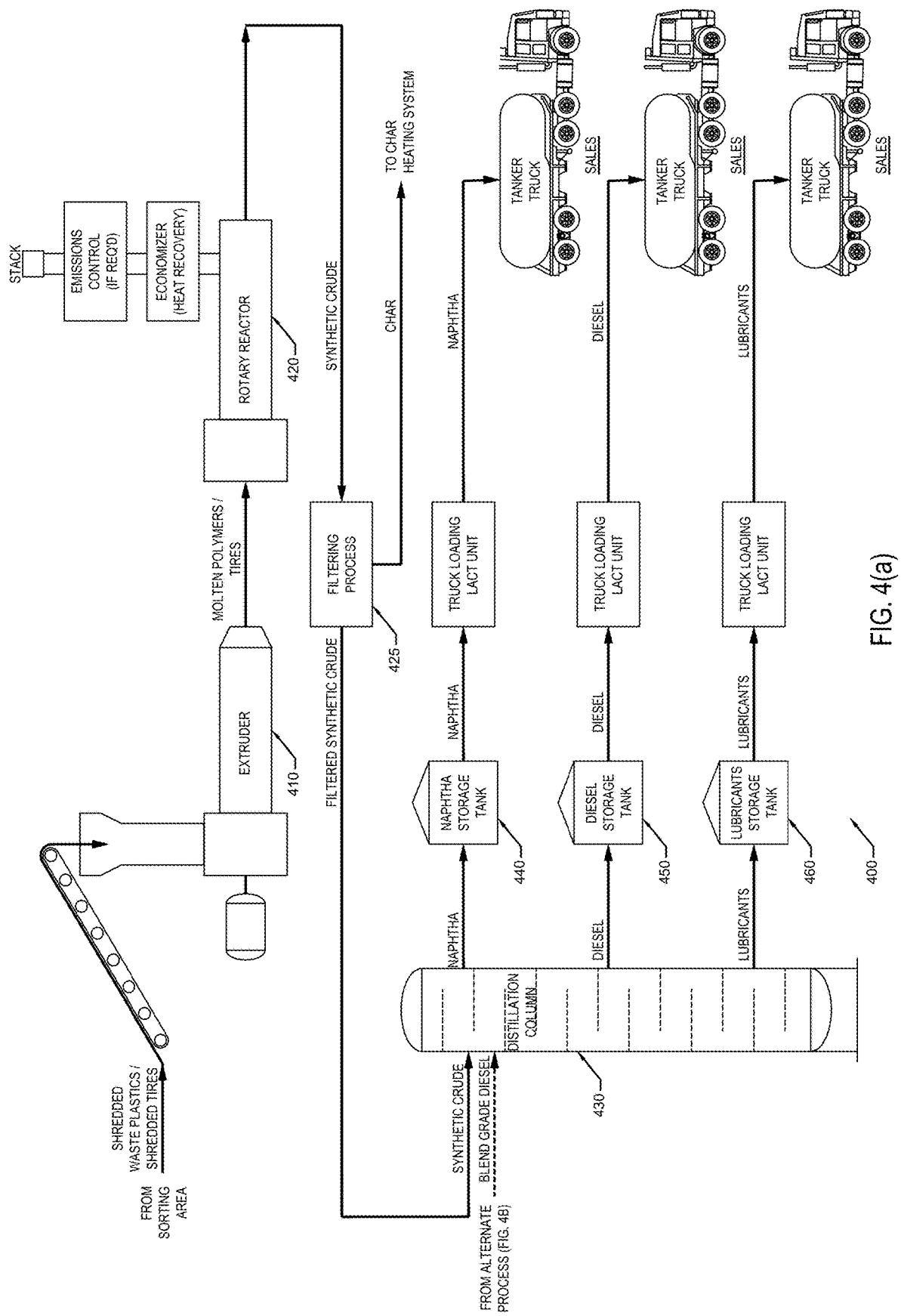
FIG. 4(a) illustrates a flow diagram of a large VLT plastics-to-diesel (PTD) system
Figure 4B:
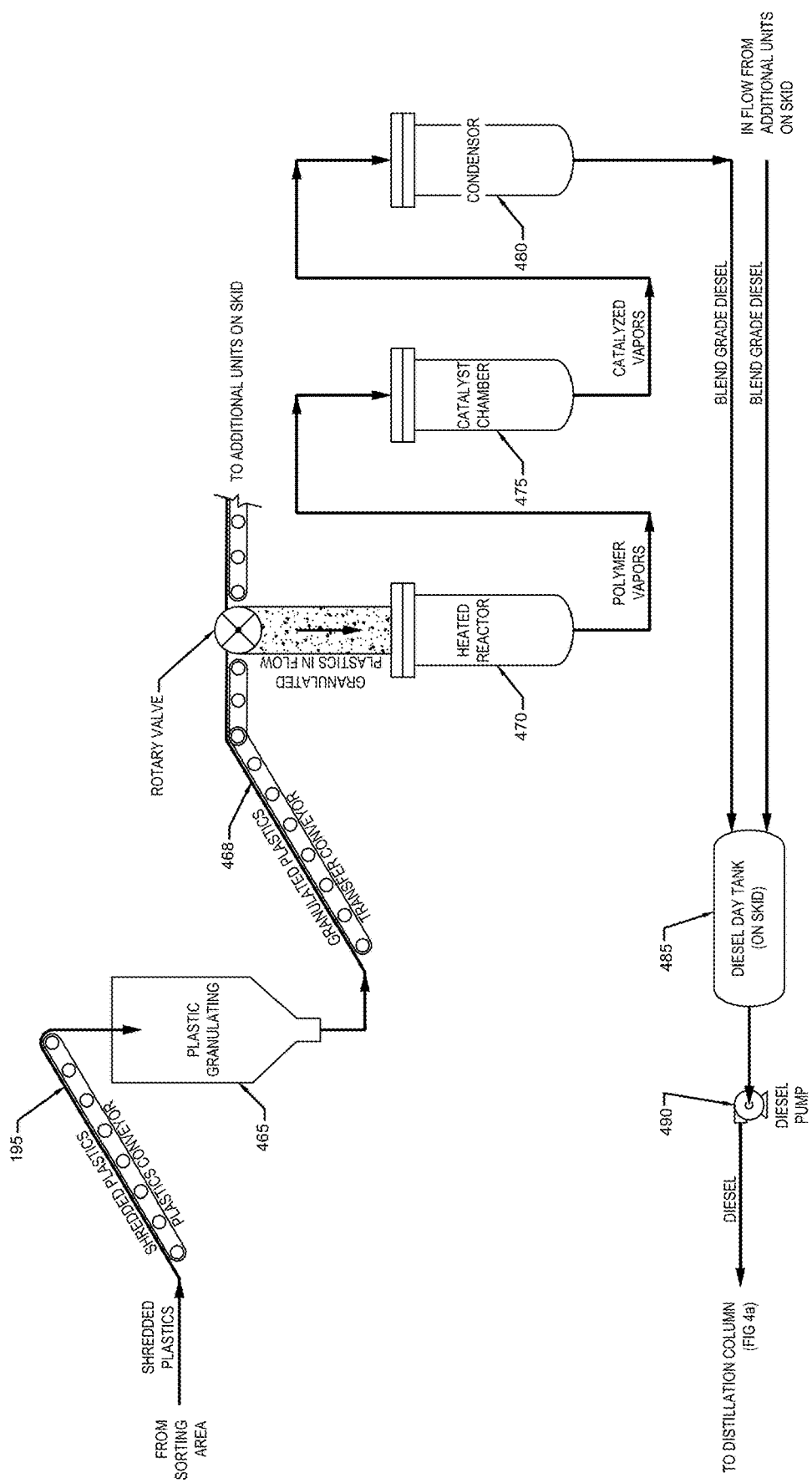
FIG. 4(b) illustrates a flow diagram of a smaller VLT plastics-to-diesel (PTD) system

FIGS. 4(a) and 4(b) illustrates a flow diagram of the VLT plastics-to-diesel (PTD) section 400. The plastics to diesel section design in each particular case is determined by the volume of plastics to be processed at any given facility. For larger systems, the system layout in FIG. 4(a) can be used. For smaller systems (under 75 TPD), the system illustrated in FIG. 4(b) can be used.

Larger Plastics to Diesel Processing System (>70 TPD)

As plastics are sorted out at the front end of the process, it will be gathered to be forwarded to the Plastics to Diesel Processing System 400. These plastics will be shredded in preparation for further processing.

There are several important distinctions about the process that should be noted here as it relates to plastics processing in the facility as opposed to plastics recycling in present day modern recycling programs. These distinctions are:

1) There are 6 primary types of polymers that are manufactured globally today—PET, HDPE, Vinyl, LDPE, PP, and PS (see below). Of these 6, only 3 are commonly recycled at this time—PET, HDPE and PP. Therefore, half of the plastics types manufactured today are not usually recycled.

2) Of the 3 types of plastics that are recycled, they are also sensitive to color. Therefore, for most of these 3 types, they are also color sorted. This adds significantly to the handling costs of these materials.

3) This process is plastics agnostic. All 6 types of plastics (and tires) are handled including Styrofoam. There is no need for color sorting. For these reasons the process is superior and more cost effective than present plastics recycle processes. It is simpler and easier to manage than complex, unwieldy modern plastics recycling programs. And, importantly, it is all done at one location.

Incoming Section Plastics

At the front end of the facility is the sorting and shredding sections as described earlier in this document. It is intended that the plastic stream captures most of the plastics in the MSW received in the facility. There are several types of plastics that would fall into that category. These are:

1) PET (Polyethylene terephthalate): These include soda, water, and medicine bottles, beanbags, rope, car bumpers, fiber fill, boat sails, etc.

2) HDPE (High Density polyethylene plastics): Heavy containers for laundry detergent, bleaches, milk, shampoo, and motor oils. Also includes toys, piping, truck bed liners, and rope.

3) Vinyl—PVC: PVC pipe, shower curtains, medical tubing, vinyl dashboards, vinyl flooring, window frames, and siding.

4) LDPE (Low Density polyethylene plastics): Thin flexible plastic wrap, grocery bags, and soft packaging material.

5) PP (Polypropylene): Strong food containers and large portion plastic cups.

6) PS (Polystyrene): (Commonly called Styrofoam)—coffee cups, disposable cutlery, meat trays, packing "peanuts" and insulation. Never recycled.

All these plastics can be processed in the facilities. Of these, the hardest to sort out may be the LDPE products. Especially the smaller wrappers and bags. Because the WTE gasifiers can also handle plastics, an inordinate amount of time and resources are not wasted to sort out small pieces. These plastics can be handled in either section.

After sorting into the plastics stream, the plastics are passed through the shredding process to prepare it for insertion into the extruder 410 (next step). A nominal size of about ½" squares works well in many embodiments.

Incoming Section Tires

Figure 6:
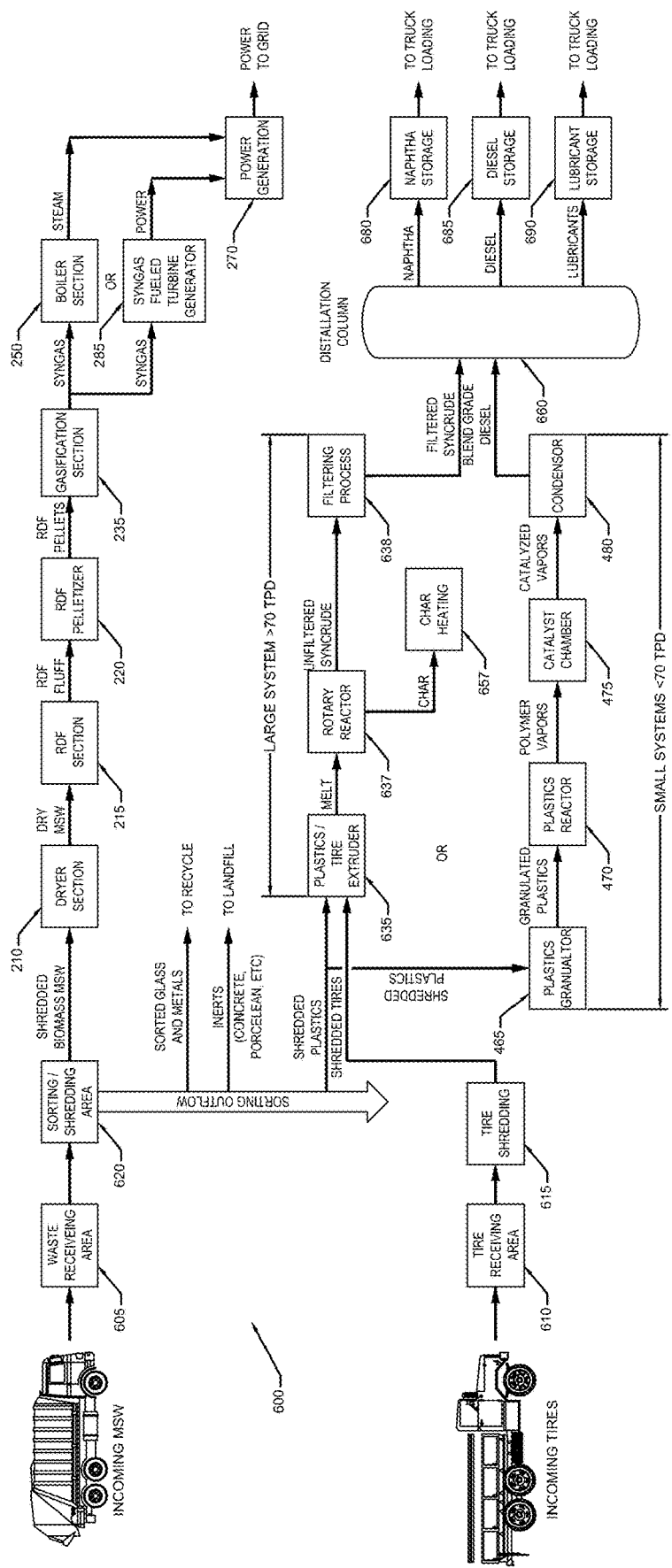
FIG. 6 illustrates a flow diagram of the VLT system.

As shown in the VLT system 600 of FIG. 6, tires can be brought in 610 as a separate stream from MSW. Shredding 615 is easily accomplished to achieve the ½" squares for the extruder 410, 635. The process even handles the metal in the steel belted radial tires. It passes through the extruder 635 and the rotary reactor 637 and is removed via magnets later in the process. Therefore, tire preprocessing is one of the simpler parts of the process.

Extruder Section

After shredding 615, 620, the plastics are introduced to the first phase of the plastics processing, the extruder 410, 635. An extruder 410, 635 is a large rotary screw that turns in a heated barrel. The plastic is fed into the extruder 410, 635 via a conveyor on the front end and dropped into the "throat" of the extruder 410, 635 from overhead. The rotary screw moves the plastics (polymer and/or tire rubber) down the "flights" (threads) of the extruder 410, 635 and melts them as they move. This melting is done primarily by the "work" (the mechanical action of friction on the polymer by the screw rotating the polymers against the extruder barrel) thus heating the polymer to melt temperature (the barrel is also heated—in a typical extruder about 60% of the heat in the polymer is added via the work—friction). At the discharge of the extruder 410, 635, the molten polymers/tire rubber is at about 400 to 500° F. It discharges into a heated pipe manifold and it flows to the next section of the process.

Rotary Reactor

The next section of the plastics processing is in the Rotary Reactor 420, 637. The Rotary Reactor 420, 637 is specially designed rotary kiln designed to further add heat to the polymer via a specific torturous path that breaks down the polymer strings into a new synthetic crude vapor. Using "syngas" created in the kiln (and utility natural gas at startup), these gases are used to fire a kiln burner that further heats the polymers/rubber to about 2,100° F. This additional heat breaks down the hydrocarbons in the molten polymer/rubber and turns it into a "SynCrude" vapor product that is further processed in the next section of the plant. Using a proprietary catalyst and condenser process the SynCrude vapor is condensed into a Syncrude liquid. Any remaining vapors are used in further rotary reactor heating. From the rotary reactor 420, 637 several usable products can be harvested:

Syncrude for further processing into diesel/naphtha/lubricants

Syngas which can be used for reactor heating and for additional heat in the Thermal Oxidizer for making power (the reactor makes more syngas than is needed for heating plastics only)

Char—solids outputted from the reactor (through effluent filtering) with BTU content for use later Stack Waste Heat—which is captured via an economizer to add additional heat to the power generation system At the discharge from the Rotary Reactor 420, 637, the SynCrude is forwarded to a filtering process 425, 638, to remove carbon particulates acquired during the heating process. From the unfiltered Syncrude inflow, the filter outflow is filtered Syncrude, now ready for the distillation process 430, 660, for further processing. The second stream is Char (carbon residue filtered from the SynCrude). The Char is forwarded to the Char Processing area 657 for additional BTU recovery.

Distillation System

The distillation column 430, 660 and condenser are used for separation of the key components of the SynCrude and blend grade diesel into ASTM D975 spec grade low sulfur diesel fuel and naphtha. A distillation column is used for separation of liquid fuels into their individual components. In this case it is diesel (the heavier product) in the middle or lower sections and naphtha (the lighter product) off the top. These products are then forwarded to tanks on site for diesel 450, 685 and naphtha 440, 680 storage. Lubricants can also be made and stored in a separate tank 460, 690. Product Storage and Truck Loading The final section of the Plastics to Diesel facility is the fuel storage and truck loading section. Here the products are stored in separate tanks 680, 685, 690 awaiting pickup by tanker trucks. When product is ready for pickup, arrangements are made for the buyer to pick up the product via tanker truck.

Tanker trucks come into the truck loading section for loading. Each station has a "Lease Allocation Custody Transfer" (LACT) meter that measures and controls the amount of product to be loaded to a truck. The LACT units measure, track, and report all loads of diesel or naphtha being purchased at any time. The information from the LACT unit is collected by a "Terminal Automation" database software system. This system is in turn integrated into the consolidated financials via a near-real-time integration with the ERP (Enterprise Resource Planning & Forecasting) system and provides the load listing information for each buyer. From the ERP, billing is done on scheduled fiscal intervals.

Smaller Plastics to Diesel Processing System (<70 TPD)

The economics of each system to be installed considers the costs and benefits of specific configurations for a VLT installation. In the case of smaller systems (e.g. 70 tons per day, or less of plastics), the costs of the larger Plastics to Diesel system described above could prove to be prohibitive. Therefore, other technologies may be implemented in smaller systems that enable manufacture of low sulfur diesel at reduced flow rates and scales that still achieves the goal, at a lower total installed cost.

FIG. 4(b) illustrates the flow diagram for the smaller system outlined in this section. Shredded plastics are introduced into the system from the incoming plastics conveyor section 195. Due to the smaller size of this reduced system, the incoming plastics are granulated to a smaller size for processing in a smaller reactor. The shredded plastics are introduced into the granulator 465 where reduction of the waste plastics size occurs in a finer, granulated product. After granulation, the waste plastics are ready for introduction into the small plastics to diesel process. At the discharge of the granulator, a conveying system 468 transfers the granulated plastics to the inlet section of the reactor 470. A meter valve is installed for each reactor to throttle the flow rate of waste plastics into the reactor 470. Other conveyances and hoppers can be used to hold and/or transfer the granulated plastics to the reactor depending upon the location and physical configuration of each facility. It should also be noted that this system design can serve feed rates of 1 to 5 tons per day. Systems can be installed in parallel to achieve higher throughput. Flow rates of 5 to 70 tons per day of processing in this fashion can be realized.

Heated Reactor

FIG. 4(b) next represents the Heated Reactor 470 where the first step of conversion of the plastics to diesel occurs. There are various proprietary means by which this reactor 470 can be heated. The reactor 470 contains a proprietary medium that is heated and through which the granulated plastics are introduced. Upon introduction into the reactor chamber, the plastics undergo vaporization in a progressive manner until the vapors exit at the bottom of the chamber.

Catalyst Chamber

Next, the vapors migrate to the Catalyst Chamber 475 where the vapor is introduced to a proprietary catalyst medium that catalyzes the syncrude vapors to a low sulfur diesel blend stock.

Condenser

Figure 5:
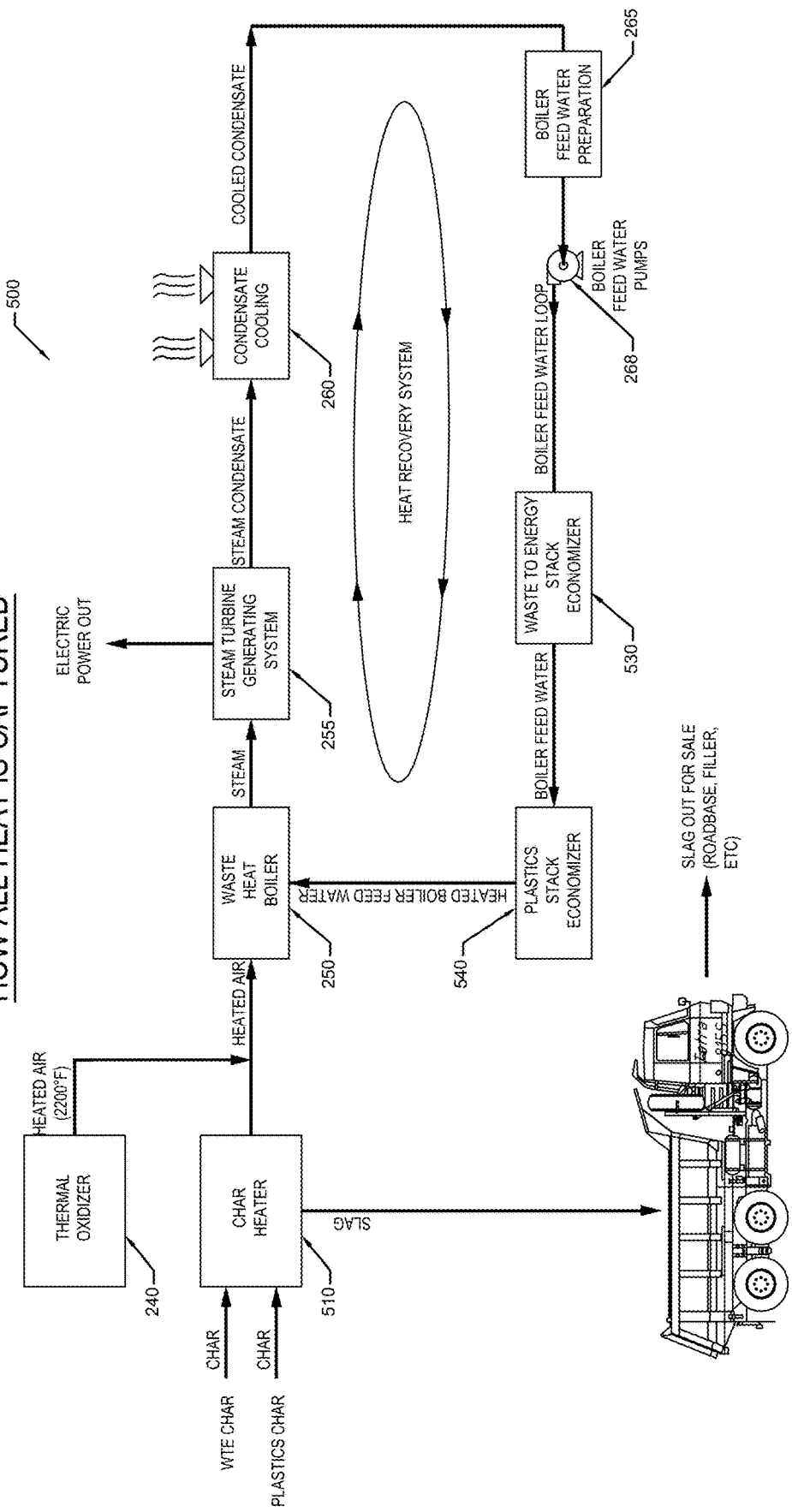
FIG. 5 illustrates how heat is recovered and reused in a VLT system

After catalyzation, the low sulfur diesel blend stock vapors pass through a Condenser Chamber 480 where they are further cooled and liquified. From there the liquids are gravity drained to a small skid mounted Day Tank 485 where the liquids are temporarily held. A specific skidded system may hold up to 5 parallel units on a single skid (depending upon the production needs at a specific installation). Multiple 5 TPD skids in parallel can also be used. Diesel Pump From the days tanks, the Diesel Pump 490 pumps the blend stock diesel fuel to the Distillation Column System 430 for further refining to meet the ASTM 975 standard for low sulfur diesel. FIG. 5 illustrates a flow diagram of the VLT economizer section 500 and details how heat is captured.

Waste Heat Recovery and Use

A great deal of heat and energy is created and used in the process. In order to more efficiently use energy that is being created in the facility, waste heat is captured and recycled in the facility. These are referred to as the "Waste Heat" systems. These sources are as follows:

Thermal Oxidizer Stack Heat

As described earlier, the syngas created by the gasifier is used to heat air to some 2,200° F. in the thermal oxidizer 240. At these temperatures, there is a great deal of heat that is created. Most of the heat is transferred while creating steam in the waste heat boiler 250. After the steam passes through the steam turbine generator(s), the steam condenses into warm steam condensate and must be cooled for preparation for the next cycle of use in the boiler. The condensate is cooled via the Condensate Coolers 260. The cooled condensate is then ready for boiler feedwater preparation as described earlier in this document.

Once the boiler feedwater is prepared for the next step in unit operation, it exits the boiler feedwater preparation system and enters the suction side of the Boiler Feedwater Pumps 268. These pumps provide the head needed to circulate the boiler feedwater through the upcoming economizers and ultimately into the waste heat boiler steam drum to maintain boiler system level required for steam production. Upon discharge from the Boiler Feedwater Pumps 268, the boiler feedwater can be passed through the gasifier system economizer and/or cooling system 260 (see FIG. 2(a)) and 530 (see FIG. 5), depending upon which system is implemented in a specific application. After passing through this system, the boiler feedwater exists the gasifier economizer 530 and is passed the Plastics To Diesel Reactor Stack Economizer 540. Here additional BTU's are added to the Boiler Feedwater. This in turn will improve boiler heating efficiency in the Waste Heat Boiler 250. Through this loop, the VLT captures all available heat from all sources on site, resulting in the highest possible efficiency and use from all energy sources on site. Rotary Kiln Char The Plastics to Diesel Rotary Kiln 420 also produces a Char byproduct (filtered out in the filter process 425). This char has a BTU content of value. This Char can be processed for additional heating below.

Char Heating System

All the Char described above is collected and conveyed to the Char Heating System 510, essentially a small boiler. The Char is combusted in the heater 510 and the heat is added to the heat discharged from the Thermal Oxidizer 240. This combined heat source is added to the Waste Heat Boiler 250 to produce even more steam and thus more power.

Total Waste Heat Recovery Power Generation Potential

Obviously, a function of total plant capacity and size, the heat recovery potential for power generation is considerable. For a typical facility, an additional 1 to 2 megawatts of power are expected. Larger facilities may even recover more power. System efficiency can be further optimized during final tuning of the facility.

Emissions

In any kind of Renewable Energy project with some measure of processing and heat generation, the issue of emissions management is important. The VLT is, of course, solving significant ecological problems with MSW and plastics. Having said that, a fair assessment of any emissions that may be produced by such a facility is made. The two key emission streams (above and beyond heat, which is captured to reduce heat loss), are as follows:

The combusted syngas in the thermal oxidizer from the Gasifiers and the Rotary Reactors; and The stack gases from the Char Heater.

As to the syngas combustion emissions, it is a function of the gases that are being combusted and an interesting tradeoff the process creates that is an environmental gain.

At the back end of the process the emission sources are combined for scrubbing to remove key emissions ($CO_2$ and $NO_x$). See description below.

First, with regards to combusted gases: As to the gasifier 235, it is creating primarily hydrogen, Carbon Monoxide, and Methane. Hydrogen, when combusted makes water. Carbon Monoxide (a very flammable gas) and Methane, when combusted make $CO_2$. There is also a potential to make $NO_x$, which is a more impactful emission.

A key emission from the Char heater 510 will also be $CO_2$.

$NO_x$ can and is removed through a Continuous Emissions Monitoring System (CEMS) that can be installed in the discharge stack for the plant. On this system is a $NO_x$ analyzer on the inlet and outlet of the stack that measures the $NO_x$ levels before and after the flue gas enters the stack. Through injection of an anhydrous ammonia spray, the $NO_x$ gases are removed. (This CEMS technology has been used for many years. It is a proven, safe technology).

$CO_2$ emissions can also be dealt with. There are 3 interesting aspects to the $CO_2$ discussions. They are:

1) $CO_2$ will be removed through an Amine scrubbing system designed for $CO_2$ rejection. Amine systems are commonly used in the oil and gas industry to remove $CO_2$ and $H_2S$ from natural gas streams.

2) By the very fact MSW is being processed, Methane is being removed from the atmosphere. In a normal landfill, biomass decomposes and approximately 50% of the gas it creates while decomposing is methane, the other half is $CO_2$. EPA studies have shown that methane emissions have 25 to 35 times more impact on the environment than $CO_2$ emissions. Therefore, the facility already has a huge impact on improving emissions by removing all methane. The $CO_2$ gases created can then be scrubbed on the back end using an Amine unit.

3) Universities are developing methods to convert $CO_2$ directly into syngas. This technology appears to be a few years away from being ready for use but is expected to be available in the future. With $CO_2$ and $NO_x$ scrubbed in the above manner, VLTs provide a substantially clean emission process that is cleaner than most clean burning natural gas fired power plants.

There are numerous off the shelf scrubbing technologies (both wet and dry) available to address any further remediation. Various embodiments also can perform electrostatic precipitation to remove solids from the emission stream. The remediation to be done can be assessed on a project by project basis. Selected emission controls are a function of feedstocks processed with resulting emissions and local environmental ordinances, regulations, and permitting requirements. The emission levels for these facilities can meet or exceed standards set by any government agencies at this time.

Balance of Plant

There are several other facility assets remaining in the balance of plant. In no particular order, they are as follows:

Buildings and Site Assets

For a facility of this kind and scale, there will be several buildings needed. These will include:

1) Incoming/Sorting Section

The Incoming/Sorting section 605 and 620 houses the areas where the waste trucks dump their MSW loads and sorting occurs. Because of the volume of MSW, the sorting into the 4 product streams described (as well as tires) and the shredding that will be occurring at the front of the process, this section can be rather substantial. It can be kept under a roof (to keep dry and protected from wind). 2) Gasification Area Most of the updraft gasification system can reside outdoors. The front-end incoming feedstock (pelletized RDF) may be kept under roof to keep dry for gasifier processing. Different areas have different weather/regional challenges. For example, in the US urban north, winter weather could pose an operational problem for some of the equipment (snow and ice related). In tropical regions, extreme weather events (tropical storms and hurricanes) also pose a variety of challenges.

Therefore, for each project careful review of the environmental challenges are performed so that appropriate engineered solutions to any of the local challenges can be determined.

3) Plastics/Tires to Diesel/Truck Loading Section

The extruder areas are kept under roof. The balance of the Plastics/Tire to Diesel assets can be outdoors. The extruder sections 635 include all incoming processing, shredding, and conveyance to the extruder of feedstocks. As the molten polymers leave the extruders, they proceed out of the building via a heated manifold pipe to the inlet of the Rotary Reactor 637. The balance of the Plastics to Diesel assets are outdoor equipment all the way through to the diesel and naphtha storage tanks. Smaller systems as described in FIG. 4(b) can be under roof, indoor systems. Canopies can be installed over the truck loading areas (LACT units). These can include gas and flame detectors and fire suppression for driver safety, plant safety, and shutdown systems.

4) Terminal Outgoing Section

There can also be a substantial area for outgoing material (above and beyond diesel truck loading). These areas may be used for housing and shipping recycled glass and metals and the inerts described earlier. A temporary storage area can be provided for the slag output from the Char heating system. All these materials can be staged in this area. How much housing is desired can be determined on a site by site basis.

5) Power Distribution Center (PDC) Building

For an asset of considerable size and complexity, there may be a rather substantial PDC building. Electrical power equipment manages and monitors all power generation happening on site. Additionally, the power used on site for local plant needs may be substantial. This equipment includes switchgear, large motor control centers (MCC's), Variable Frequency Drives (VFD's), generator controls, heater controls, etc. It is possible multiple, separate PDC's can be used.

The PDC building can also house the main control cabinets for the site main control systems. These include Basic Process Control System (BPCS) and the site Safety Instrumented Systems (SIS). These are state of the art control platforms linked to a site wide HMI (Human Machine Interface) system located in the main site control room.

6) Control Room

Central to a facility of this scale is the main Control Room. The Control Room is the main area of facility operation and administration. Using all the tools available in a modern control room, the Control Room provides a view to the entire facility (via the HMI's) through to the BPCS, SIS, security camera systems, alarm management, and trend systems. It also provides an IT closet for the control system and enterprise IT equipment.

Buildings/Site Specifications of Note

Due to the nature of a facility such as a VLT and the diverse geographic areas where they may come into play, some consideration can be given to building requirements that address special needs of particular areas. Assuming that all the buildings are designed to meet codes and standards for most modern facilities, there are a few cases that merit further consideration herein. They are:

1) Hurricane Regions

One of the more significant impacts of concern for any facilities is the issue of hurricanes. Hurricane preparedness is a matter of the highest urgency to many locations. Enough cannot be said about the level of concern of the impact of hurricanes in certain regions, especially in the aftermath of hurricane Maria is 2017 and others more recently. These kinds of events have impacts that are extreme.

Outdoor equipment (mechanical systems, structures, tanks, etc.) may be fortified to provide withstand capabilities for extreme weather events. And in the event of a hurricane, the facility can be shut down and shut in before the event occurs to allow for the best chance of survival.

It should also be noted here that this is another case where the fact that the VLT creates its to own power is significant. Even if it is necessary to have a "black start" generator for restart because the local power grid is down, the facility is able to restart and get it back on line relatively soon after such an event, especially if built to the standards described above.

2) Earthquake (Seismic) Zones

Similar in nature (in impact) to hurricanes, earthquakes are another real hazard that many areas are facing. Special engineering steps can be taken to provide the levels of structural support needed to withstand an earthquake. Civil/

Structural engineering standards exist to help mitigate the risks of seismic events. In addition to building codes and standards, seismic monitoring equipment can be used to detect such an event and execute an organized shutdown for the facility should one occur. This provides a shutdown and shut in capability that can minimize the risk of exposure if a seismic event occurs.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A method for displacing services required by local landfills with a Virtual Landfill Terminal (VLT), the method comprising:
   receiving municipal solid waste (MSW) at the VLT;
   receiving waste tires at the VLT;
   separating the MSW into biomass, recyclables, and waste plastics at the VLT;
   processing the biomass, at the VLT, to produce syngas using an updraft gasifier;
   processing the waste plastics, at the VLT, to produce naphtha, low sulfur diesel fuel, and lubricants;
   processing of tires, at the VLT, to produce naphtha, low sulfur diesel fuel, and lubricants;
   capturing all produced liquid fuel in separate local tankage for storage at the VLT;
   providing custody transfer metering and truck loading for product sales and distribution from the VLT;
   capturing waste heat from the processing of the biomass, plastics and tires; and
   generating electricity, at the VLT, using the created syngas and waste heat;
   wherein using the VLT process eliminates methane emissions from all MSW processed; and
   wherein the method substantially removes all Landfill Gas emissions from the VLT, thus significantly lowering greenhouse gas emissions from the local landfill.

2. The method of claim 1, wherein processing the plastics includes using a rotary pyrolysis reactor to create synthetic crude vapors.

3. The method of claim 1, further comprising using a distillation column to produce the naphtha, low sulfur diesel fuel, and lubricants from the synthetic crude.

4. The method of claim 1, wherein processing the shredded and dried biomass includes creating refuse derived fuel (RDF), and pelletizing the RDF to create RDF pellets.

5. The method of claim 4, further comprising using the RDF pellets created at the VLT in the gasifier as feedstock.

6. The method of claim 1, where the VLT generates electricity by powering an Internal Combustion or Turbine Engine Generator(s) fired using the syngas.

7. A virtual landfill terminal system for processing municipal solid waste, the system comprising:
   a municipal solid waste (MSW) receiving system, at the VLT, for receiving MSW and separating the MSW into biomass, recyclables, and plastics;
   a biomass processing system for processing the biomass to produce syngas, the biomass processing section having an updraft gasifier;
   a plastics processing system for processing the plastics to produce naphtha, diesel fuel, and lubricants using a rotary pyrolysis system;
   a tires processing system for processing the tires to produce naphtha, diesel fuel, and lubricants using the rotary pyrolysis system;
   a waste heat capturing system for capturing waste heat from the processing of the biomass processing section and from the plastics processing section of the plastics; and
   an electricity generator system for generating electricity using the syngas and waste heat.

8. The virtual landfill terminal system of claim 5, wherein the plastics processing section comprises:
   a granulator configured to granulate plastics;
   a plastic reactor configured to vaporize the granulated plastics to generate syncrude vapors;
   a catalyst chamber configured to catalyze the syncrude vapors to generate a diesel blend stock; and
   a condenser configured to liquefy the diesel blend stock.

9. A virtual landfill terminal system for processing municipal solid waste, the system comprising:
   a municipal solid waste (MSW) receiving section for receiving MSW and for separating the MSW into biomass, recyclables, and plastics;
   a biomass processing section for processing the biomass to produce syngas, the biomass processing section having a gasifier;
   a plastics processing section for processing the plastics to produce naphtha, diesel fuel, and lubricants;
   a waste heat capturing system for capturing waste heat from the processing of the biomass processing section and from the plastics processing section of the plastics; and
   an electricity generator for generating electricity using the syngas and waste heat, wherein the plastics processing section comprises:
   an extruder configured to melt plastics to generate molten polymers;
   a rotary reactor configured to heat the molten polymers to generate syncrude vapors; and
   a filter configured to remove carbon particulates from the syncrude vapors.

10. The method of claim 1, wherein processing the tires includes using a rotary pyrolysis reactor to create synthetic crude vapors.

11. The method of claim 1, further comprising using a catalyst and condenser to liquefy synthetic crude vapors produced by the rotary pyrolysis reactor into a syncrude liquid prepared for further processing at the VLT or for sales.

12. The method of claim 1, further comprising using a distillation column to produce the naphtha, low sulfur diesel fuel, and lubricants from the synthetic crude.

13. The method of claim 1, further comprising capturing naphtha, low sulfur diesel, and/or lubricants downstream of the distillation column in local storage tanks for sales.

14. The method for claim 1, further comprising providing custody transfer metering and truck loading stations for naphtha, low sulfur diesel for sales distribution from the VLT.

15. The method of claim 1, further comprising using the syngas vapors created in the rotary pyrolysis reactor process to provide heating fuel for the rotary pyrolysis reactor in the VLT.

16. The method of claim 1, further comprising using the excess syngas vapors created in the rotary pyrolysis reactor for creating additional heat in the thermal oxidizer to make steam for power generation at the VLT.

17. The method of claim 1, wherein char created during the operation of the rotary pyrolysis reactor is used to create more heat in a char heater in order to make more steam power.

18. The method of claim 1, wherein processing the biomass includes shredding and drying the MSW biomass in preparation for further processing at the VLT.

19. The method of claim 1, wherein processing the shredded and dried biomass includes creating refuse derived fuel (RDF), and pelletizing the RDF to create RDF pellets.

20. The method of claim 19, further comprising using the RDF pellets created at the VLT in the gasifier as feedstock.

21. The method of claim 1, wherein the gasification process at the VLT creates the synthetic gas used to fuel the thermal oxidizer system.

22. The method of claim 1, wherein heat created by the thermal oxidizer system provides the heat energy used by the waste heat boiler(s) at the VLT to create steam for power generation.

23. The method of claim 22, wherein the steam created at the VLT is used to drive steam turbine generator(s) to make electric power.

24. The method of claim 1, wherein power from the steam turbine generator(s) at the VLT is used to power all internal equipment at the VLT.

25. The method of claim 1, wherein excess power not used internally at the VLT, is sold to the local electrical grid via a power purchasing agreement with a local utility, or on the open market, using standard custody transfer metering and standard utility tie in switchgear and substation equipment.

26. The method of claim 1, further comprising emission management systems configured to reduce all emissions from the VLT to acceptable levels by all regulatory authorities.

27. The virtual landfill terminal system of claim 7, wherein the biomass is pre-shredded, and dried to create Refuse Derived Fuel (RDF) for the VLT.

28. The virtual landfill terminal system of claim 27, wherein the RDF is compacted and pelletized for fuel feedstock for an updraft gasifier.

29. The virtual landfill terminal system of claim 27, wherein an updraft gasifier gasifies the RDF feedstock to create Synthetic gas (syngas).

30. The virtual landfill terminal system of claim 29, wherein the syngas from the updraft gasifier is used as fuel by a thermal oxidizer system to create heat.

31. The virtual landfill terminal system of claim 30, wherein the heat created by the thermal oxidizer is conveyed to a heating section of a waste heat boiler to make steam, charging a steam header.

32. The virtual landfill terminal system of claim 7, wherein char from the rotary pyrolysis reactor is conveyed to, prepared for, and used in a char heater.

33. The virtual landfill terminal system of claim 7, wherein the heated air from the char heater is added to hot air feeding the waste heat boiler to make more steam.

34. The virtual landfill terminal system of claim 31, wherein the steam in the steam header is used to power steam turbine generator(s) to make electricity.

35. The virtual landfill terminal system of claim 7, wherein the syngas produced by the updraft gasifier is used to provide fuel for an internal combustion engine or turbine engine to act as a prime mover for the electric generating system.

36. The virtual landfill terminal system of claim 7, wherein the power generated by the VLT provides all power used by the VLT site.

37. The virtual landfill terminal system of claim 7, further comprising a power distribution system configured to supply power to the VLT, wherein all excess power is sold to the local electric grid for public use.

38. The virtual landfill terminal system of claim 7, further comprising a waste plastics shredding and conveying system for sorting and shredding waste plastics to a nominal 2" square size to be used as feedstock to a plastics extruder system.

39. The virtual landfill terminal system of claim 7, further comprising a tire shredding and conveying system for sorting and shredding waste tires to a nominal 2" square size for use as feedstock to an extruder system.

40. The virtual landfill terminal system of claim 7, further comprising a rotary extruder for melting and pressurizing waste plastics in preparation for introduction into the rotary pyrolysis reactor.

41. The virtual landfill terminal system of claim 7, further comprising a rotary extruder for melting and pressurizing tire rubber in preparation for introduction into the rotary pyrolysis reactor.

42. The virtual landfill terminal system of claim 7, wherein the rotary pyrolysis reactor is used to breakdown waste plastics and convert the waste plastics to a synthetic crude vapor.

43. The virtual landfill terminal system of claim 7, wherein the rotary pyrolysis reactor is used to breakdown tire waste and convert the tire waste to a synthetic crude vapor.

44. The virtual landfill terminal system of claim 42, wherein the synthetic crude vapor is cooled and condensed to create a synthetic crude.

45. The virtual landfill terminal system of claim 43, wherein the synthetic crude vapor is cooled and condensed to create a synthetic crude.

46. The virtual landfill terminal system of claim 7, wherein syngas that is created during the use of the rotary pyrolysis reactor is used as fuel gas for the reactor itself.

47. The virtual landfill terminal system of claim 7, wherein all excess syngas from the rotary pyrolysis reactor is collected and forwarded to the thermal oxidizer system to make steam for power generation.

48. The virtual landfill terminal system of claim 7, wherein the synthetic crude is filtered to extract carbon residue created during the rotary pyrolysis reactor.

49. The virtual landfill terminal system of claim 48, wherein the filtered synthetic crude is stored in local storage tanks for synthetic crude sales.

50. The virtual landfill terminal system of claim 7, wherein the filtered synthetic crude vapor is catalyzed and condensed to provide feedstock for distillation to produce naphtha, low sulfur diesel, and lubricants.

51. The virtual landfill terminal system of claim 7, wherein distillation of synthetic crude produces sales grade naphtha, low sulfur diesel, and lubricants.

52. The virtual landfill terminal system of claim 7, wherein tankage is provided for storage of naphtha, low sulfur diesel, and lubricants.

53. The virtual landfill terminal system of claim 7, wherein a full custody transfer metering and truck loading system are provided for naphtha, low sulfur diesel, and lubricants sales and distribution.

\* \* \* \* \*